Jan. 19, 1971 R. W. GENTILE 3,556,672
GAS TURBINE SUPPORT ARRANGEMENT
Filed May 26, 1969
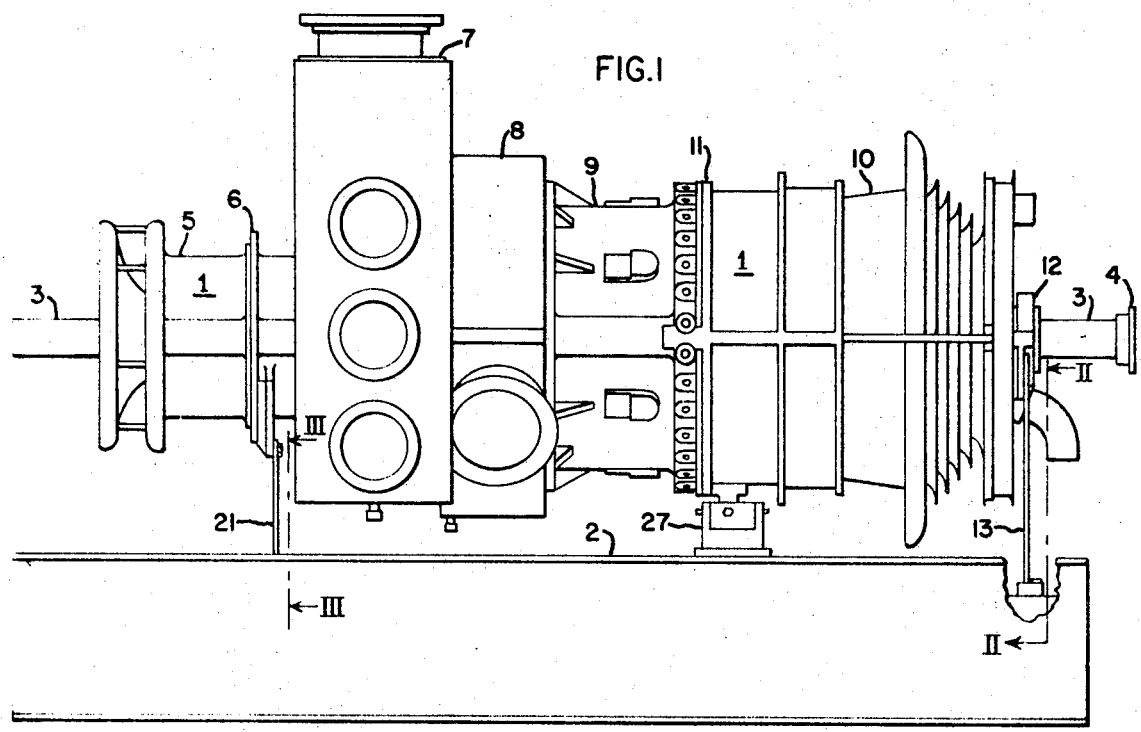
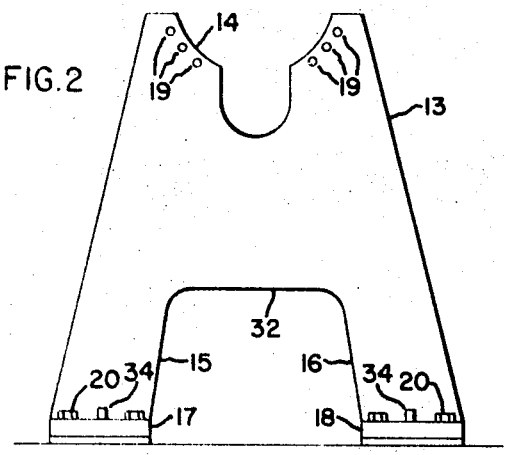
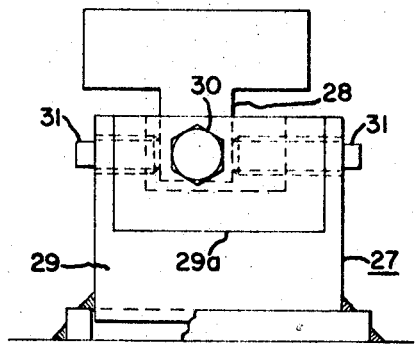
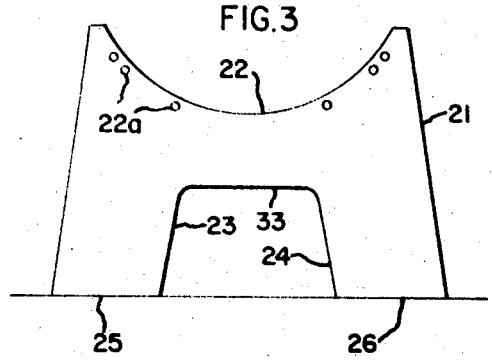
INVENTOR:
RICHARD W. GENTILE,
BY W. C. Crutcher
HIS ATTORNEY.

United States Patent Office 3,556,672
Patented Jan. 19, 1971

3,556,672
GAS TURBINE SUPPORT ARRANGEMENT
Richard W. Gentile, Schenectady, N.Y., assignor to General Electric Company, a corporation of New York
Filed May 26, 1969, Ser. No. 827,788
Int. Cl. F04f 1/06; F02c 7/20
U.S. Cl. 415—134                                                                7 Claims

ABSTRACT OF THE DISCLOSURE

A support arrangement for an axial flow elastic fluid machine comprising, after final assembly, two support plates and positioned therebetween a gib key and block assembly. The flat plates are fixed in the vertical and lateral directions but are allowed to flex in an axial direction when thermal movement occurs. The gib key is fixed in the axial direction and is positioned so as to proportion the axial movement between fore and aft support plates. In this manner proper alignment is maintained between the gas turbine shaft and load shaft. During shipment the aft support plate is removed so that the base can twist without imparting a torsional moment to the gas turbine casings.

BACKGROUND OF THE INVENTION

In general, this invention relates to a support arrangement for a gas turbine powerplant. More particularly, the invention relates to a support arrangement for an axial flow gas turbine having two flex plates and an axially fixed point in order to improve alignment characteristics.

Being a source of power for various loads, the power output shaft of a gas turbine must be coupled with the input shaft of the load. Generally, the turbine shaft is coupled directly to a compressor in order to provide power to drive that compressor. Another example is the direct coupling of the turbine shaft to a large pumping system. Such couplings between power and load usually create alignment problems. This problem is known to the art and is evidenced by the fact that the gas turbine power plant shaft is an integral rotating mass while the load shaft is a separate rotating mass and when the two shafts are coupled together, misalignment may occur. Another cause of misalignment is thermal expansion in the gas turbine. As the gas turbine is brought up to operating conditions, its temperature increases to such a degree that the thermal movements result in misalignment of the rotating shaft.

One solution is to provide a long and heavy flexible coupling to join the two shafts which will take up the large parallel offset and angular misalignment that occurs between the two shafts. This method compensates for the various misalignments by absorbing the offset but does not effectively prevent them.

In certain applications where the power plant is coupled directly to a load, it is desirable to keep the coupling shafts short in order to minimize weight. It is also desirable to keep the overall length of a gas turbine power plant and its base at a minimum. For these reasons, it is desirable to prevent misalignment rather than absorb it by providing a gas turbine support arrangement which will resist parallel an angular offset at the output shaft. A collateral advantage in designing such a support arrangement is that a minimum space for the support is realized, thereby eliminating many of the obstructions to piping around the gas turbine.

One other problem associated with support arrangements for gas turbine power plants is that of internal misalignment during shipment. A support arrangement is desired which will yield the least amount of internal misalignment, i.e., misalignment between the rotating parts and stationary parts, during shipment from the factory to the installation site, by preventing any excessive torsional moments from being transmitted to the unit casings from the shipping base.

The prior art is exemplified in the U.S. Pat. No. 2,443,054 issued to T. J. Putz et al. on June 8, 1948 which shows the use of flex plates for the mountings and alignment of a gas turbine power plant.

Accordingly, one object of the present invention is to provide an improved gas turbine support arrangement for minimizing the output shaft misalignment.

Another object of the invention is to provide a support arrangement which allows the least amount of internal misalignment during shipment.

A still further object is to elimiante the obstruction to piping around the turbine casings.

SUMMARY OF THE INVENTION

My invention is practiced by providing two flat plates located toward each end of the axial flow gas turbine which are secured to the bearing housing at one end and the gas turbine casing at the other. The flat plates hold the gas turbine rigid in the vertical and lateral directions but flex to allow the unit to expand or contract in an axial direction. Between the two flat plates is a gib block and key assembly with the key being attached to the exhaust frame to hold the power plant fixed in the axial direction. The gib key acts as the fixed point for a three point support during shipment.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is an elevation view of a gas turbine power plant and support arangement according to the present invention.

FIG. 2 is a view of the aft support taken along lines II—II of FIG. 1.

FIG. 3 is a view of the forward support taken along the lines III—III of FIG. 1.

FIG. 4 is a detailed view of the gib block and key assembly.

DESCRIPTION OF THE PREFERRED EMBODIMENT

Referring to FIG. 1, there is shown an industrial type gas turbine power plant, indicated generally as 1, mounted on a unitized base, indicated at 2. Gas turbines of this type are, of course, known to the art and will only briefly be described.

Gas turbine 1 is of the axial flow type having a rotatable shaft 3 which is mounted on bearings (not shown). At one end of the shaft 3 there is mounted a coupling flange 4, to which the load driven by gas turbine 1 is connected. The gas turbine is further comprised of an inlet casing 5, on which is located a circumferential inlet casing flange 6. Surrounding the discharge casing (not shown) is combustion header assembly 7 and combustion wrapper 8. Positioned further along the shaft 3 with respect to inlet casing 5 is the turbine shell 9. Exhaust frame assembly 10 is joined to the turbine shell 9 by the use of an exhaust frame flange 11. Bearing housing 12 supports shaft 3 at the end to which the load is connected.

The inventive concept as mentioned in the summary of the invention lies in the support arrangement with which gas turbine 1 is mounted to the unit base 2.

Before proceeding with the detailed description of the support arrangement, it will be appreciated that gas turbine 1 may be mounted on other suitable bases, other than unit base 2.

Still referring to FIG. 1, the gas turbine support arrangement consists of two support plates and an axially fixed point. Toward the end of gas turbine 1 to which the load is coupled, is located aft support member 13. Referring now to FIG. 2 in addition to FIG. 1, support member 13 is comprised of a flat plate having an arcuate portion 14 in order to accommodate bearing housing 12 and in the embodiment shown, two leg members 15, 16 to provide two lateral support points 17, 18 on the unit base 2. It should be noted that although support plate 13 has leg members 15, 16, it may be comprised of a solid flat plate. Providing leg members does economize on materials and provides an opening for auxiliary equipment that runs axially under the gas turbine. The aft support plate 13 has cutout 32, thus forming the legs. Cutout 32 is sized so that it controls both the lateral and vertical stiffness of the support. This, of course, is a factor in maintaining proper alignment of the rotatable shaft 3. Holes 19 are provided around the arcuate portion 14 in order to bolt and dowel support plate 13 to the bearnig housing 12. The two legs 15, 16 of support plate 13 are attached to the unit base 2 by bolting means 20 and doweling means 34, the reason being that plate 13 is removed during shipping.

Referring to FIGS. 1 and 3, the forward support member 21 will now be described. Support member 21 is constructed similarly to aft support member 13 of a flat plate having an arcuate portion 22 to accommodate the curvilinear surface of inlet casing flange 6 and two leg members 23, 24 to provide two lateral support points 25, 26 on unit base 2. Again, as with support plate 13, support plate 21 may be constructed of a solid flat plate rather than having legs 23, 24. Cutout 33 is sized so as to control lateral and vertical stiffness of support plate 21. Holes 22a are provided so that support plate 21 may be joined to the inlet casing flange 6. Support plate 21 may be joined to flange 6 in a suitable manner such as bolting and doweling (as shown in the drawing) or welding. The leg members 23, 24 are shown as being welded to unit base 2 although again bolting and doweling means would be suitable.

The axially fixed point of the gas turbine, generally indicated as 27, is maintained by the use of a gib block and key assembly. Referring to the detail drawing, FIG. 4, of the gib block and key assembly and further to FIG. 1, the gib key 28 is shown as attached to the exhaust frame assembly 10 at the exhaust frame flange 11. Gib key 28 is positioned axially at the hottest place along the gas turbine. This is done in order to proportion the thermal movement between aft support 13 and forward support 21 as will be more fully described in the operation. Gib block 29, which is firmly attached to the unit base 2, provides a receptacle for the gib key 28, which has substantially the same thickness in the lateral direction as does the receptacle. The receptacle is formed on the two axial sides and bottom by a cutout portion of the gib block 29 and on the two lateral sides by cover plates 29a. The axial thickness of the gib key is somewhat less than the axial thickness of the receptacle to allow for axial adjustment of the gib key 28 within the receptacle. Support bolts 30, used for shipping only and located on each lateral side of gib block 29, engage the gib key 28 in the gib block 29 and fix the gib key in its axial, vertical and lateral positions. Adjusting bolts 31 serve to axially position and then firmly lock gib key 28 in place once the proper alignment is derived at the installation site. This prevents forward or aft movement of the gas turbine unit at this point due to thermal expansion.

OPERATION

The operation of the support arrangement for the gas turbine will now be described. During shipment of the gas turbine, the aft support plate 13 is disconnected and support bolts 30 are in place so that the only support is provided by the axially fixed gib key and block assembly and the forward support plate 21. When shipping the unit, the prime concern is to isolate the unit casings from any torsional moment due to uneven supporting or lifting of the unit and base assembly. Since both the gib key 28 and forward support member 21 are attached to outer casing sections of the gas turbine, any movement occasioned during the shipment will cause the entire gas turbine unit to move relative to the gib block and key assembly and the forward support plate. The advantage of using a gib block and key assembly and the forward support plate is that the unit base can twist without imparting a torsional moment to the unit casings, thereby maintaining the proper alignment between the rotatable shaft and internal members with the unit casings. This is necessary in order to preserve the proper clearances between elements.

At the installation site for final complete assembly, the support bolts 30 are disengaged and the aft support plate 13 is connected. Before disengagement of bolts 30, the final aligning procedure is completed, placing the output shaft 3 and flange 4 in the proper position for coupling to the load. At this point the final bolting of the support plate 13 through holes 19 is made and bolts 30 are then withdrawn.

The completed support arrangement consists of forward support plate 21 and aft support plate 13 which flex in the axial direction upon thermal movement and the axially fixed gib key which is allowed to move a small amount in both the lateral and vertical directions as a response to temperature changes.

The operation of the support arrangement will now be considered in relation to a load attached to flange 4, which may be a compressor. In the case of a direct coupled load as is the compressor, it is desirable to keep the load coupling shaft short. As a result, the gas turbine support arrangement must maintain the proper alignment as previously mentioned. The two support plates 13 and 21 flex in the axial direction but operate to hold the gas turbine rigid in the vertical and lateral directions, thus allowing the gas turbine to expand in the axial direction. The gib key, being axially positioned at the hottest point, will equalize or proportion the axial movement between the two support plates. This location allows the necessary fore and aft stiffness to be built into the base without increasing its axial length. Since the aft support plate 13 is connected to the bearing housing (a relatively fixed position), the axial movement that occurs between the gib key and the aft support plate is substantially free from any angular or parallel deflections.

It will thus be appreciated that a support arrangement has been described for a gas turbine power plant which minimizes the shaft offset and angular misalignment while at the same time provides a simple construction, eliminating obstructions to piping about the gas turbine. It will further be appreciated that improved shipping characteristics are realized in that the unit casings are isolated from any twisting moment that would be transmitted from the unit base during shipment.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

I claim:

What is claimed as new and desired to secure by Letters Patent of the United States is:

1. In an axial flow elastic fluid machine having a load discharge end and an opposite intake end, said machine having a shaft mounted on bearings within bearing housings and enclosed within a casing all supported on a base, the improvement comprising:
- a first flat plate supporting said fluid machine on said base located toward the load end and said plate having means to be flexible in the axial direction and being substantially rigid in transverse directions,
- a second flat plate supporting said fluid machine on said base located toward the opposite end thereof and said second plate having means to be substantially flexible in the axial direction and being substantially rigid in said transverse directions, and
- means to fix said fluid machine in the axial direction and said last mentioned means being disposed between said first and second flat plates.

2. The improvement according to claim 1 in which the flexible means in said first and second flat plates comprises a cutout portion defining two legs and sized so as to control said transverse directions in lateral and vertical stiffness.

3. The improvement according to claim 1 in which said means to fix said fluid machine in the axial direction includes a gib block and key assembly.

4. The device according to claim 3 in which said gib key has means whereby the gib block and key assembly is adjustable in the axial direction in order to axially position said fluid machine.

5. The device according to claim 3 in which said gib key is connected to said fluid machine at the axially hottest position so as to proportion thermal movement between said first and second flat plates.

6. The improvement according to claim 1 in which said first flat plate is connected to a bearing housing located toward the load end and said second flat plate is connected to said casing located toward the opposite end of said fluid machine.

7. The improvement according to claim 1 in which said first flat plate is removably connected and further including a device to lock said means so that it provides vertical as well as axial support, whereby said fluid machine may be supported during shipment by said second flat plate and said locked means.

References Cited
UNITED STATES PATENTS

| | | | |
|---|---|---|---|
| 2,443,054 | 6/1948 | Putz et al. | 415—134 |
| 2,632,997 | 3/1953 | Howard et al. | 60—39.31 |
| 2,640,317 | 6/1953 | Fentress | 60—39.31 |
| 2,992,809 | 7/1961 | Herbage | 60—39.32 |
| 3,208,217 | 9/1965 | Sonder | 60—39.31 |
| 3,188,808 | 6/1965 | Crooks | 60—39.32 |
| 3,241,314 | 3/1966 | Fields | 60—39.32 |
| 3,313,517 | 4/1967 | Hanschke et al. | 415—134 |

HENRY F. RADUAZO, Primary Examiner

U.S. Cl. X.R.

60—39.31, 39.32